(12) United States Patent
Weinwurm et al.

(10) Patent No.: US 10,666,695 B2
(45) Date of Patent: May 26, 2020

(54) GROUP CHAT APPLICATION WITH REPUTATION SCORING

(71) Applicants: Eduard Weinwurm, Vienna (AT); Juergen Firsching, Anzing (DE)

(72) Inventors: Eduard Weinwurm, Vienna (AT); Juergen Firsching, Anzing (DE)

( * ) Notice: Subject to any disclaimer, the term of this patent is extended or adjusted under 35 U.S.C. 154(b) by 0 days.

(21) Appl. No.: 16/281,301

(22) Filed: Feb. 21, 2019

(65) Prior Publication Data

US 2020/0036761 A1 Jan. 30, 2020

Related U.S. Application Data

(60) Provisional application No. 62/703,199, filed on Jul. 25, 2018.

(51) Int. Cl.
*H04L 12/58* (2006.01)
*H04L 29/06* (2006.01)
*G06F 16/9535* (2019.01)

(52) U.S. Cl.
CPC ........ *H04L 65/403* (2013.01); *G06F 16/9535* (2019.01); *H04L 51/04* (2013.01); *H04L 51/046* (2013.01); *H04L 51/32* (2013.01)

(58) Field of Classification Search
CPC ......... G06F 3/048; H04L 51/04; H04L 51/32; H04L 65/403
See application file for complete search history.

(56) References Cited

U.S. PATENT DOCUMENTS

| | | | |
|---|---|---|---|
| 6,204,846 B1 | 3/2001 | Little et al. | |
| 7,124,372 B2 | 10/2006 | Brin | |
| 7,870,203 B2 | 1/2011 | Judge et al. | |
| 7,945,620 B2 | 5/2011 | Bou-Ghannam et al. | |
| 8,539,359 B2 | 9/2013 | Rapaport et al. | |
| 8,635,690 B2 | 1/2014 | Alperovitch et al. | |
| 9,076,129 B2 | 7/2015 | Grewal et al. | |
| 9,178,950 B2 | 11/2015 | Kansky | |
| 9,461,947 B1 | 10/2016 | Lan et al. | |
| 10,182,024 B1* | 1/2019 | Chung | H04L 51/04 |
| 2007/0078675 A1 | 4/2007 | Kaplan | |
| 2009/0070376 A1* | 3/2009 | Eom | G06F 40/103 |
| 2009/0125980 A1 | 5/2009 | Alperovitch et al. | |

(Continued)

FOREIGN PATENT DOCUMENTS

CN 1908877 A 2/2007

*Primary Examiner* — Jeong S Park
(74) *Attorney, Agent, or Firm* — Hall Estill Attorneys At Law (57) ABSTRACT

Method and apparatus for applying reputation scoring to participants in a group chat session in a computer network. The group chat session is displayed in the form of a visually perceptible conversation arranged as a sequence of communications by a group of users of network accessible devices. Each user has an associated reputation score generated responsive to at least one characteristic of a previous communication by the associated user. Each network accessible device displays each communication using a visual indicia selected in relation to a magnitude of the associated reputation score for the user who generated the communication. The visible indica can take a variety of forms such as different sizes of comments, different color schemes, different fonts, and so on.

22 Claims, 7 Drawing Sheets

(56) References Cited

U.S. PATENT DOCUMENTS

| | | | |
|---|---|---|---|
| 2010/0293170 A1* | 11/2010 | Hall | H04L 51/32 |
| | | | 707/750 |
| 2010/0318614 A1 | 12/2010 | Sager et al. | |
| 2014/0074560 A1 | 3/2014 | B'Far et al. | |
| 2015/0100538 A1* | 4/2015 | Chung | G06Q 10/101 |
| | | | 706/52 |
| 2016/0246460 A1 | 8/2016 | Cao et al. | |
| 2018/0034756 A1* | 2/2018 | Allen | H04L 51/04 |
| 2018/0039893 A1* | 2/2018 | Bastide | G06N 5/04 |
| 2018/0375812 A1* | 12/2018 | Mao | G06F 40/169 |

* cited by examiner

GROUP CHAT APPLICATION WITH REPUTATION SCORING

RELATED APPLICATIONS

The present application makes a claim of domestic priority to U.S. Provisional Patent Application No. 62/703,199 filed Jul. 25, 2018, the contents of which are hereby incorporated by reference.

BACKGROUND

Group chat applications (apps) are becoming increasingly popular as a mechanism for allowing users of networked devices (e.g., smart phones, tablets, computers, etc.) to communicate with one another in essentially real time. Such apps can facilitate text-based conversations in a variety of forms such as chat rooms, message boards, private messages, text messages, etc.

In a typical group chat application, launching the app on a local network device allows the app to communicate with one or more remote servers across a network. Messages from other chat participants on remote client devices are routed through the servers and returned and displayed on a user interface of the local network device. Similarly, messages from the local user are displayed locally as well as routed through the servers for display on the remote client devices. The communications may take place using a web browser or a special API interface associated with the app. The conversation is often arranged as a sequential thread so that new comments from various members of the group are added to the top or the bottom of a listing of previous comments in the conversation.

Some group chat apps can support large numbers of group members at the same time. This capability can advantageously allow many participants to observe and, as desired, contribute to an on-going conversation. However, if too many comments are being added, new comments may appear at a rate that is faster than the members can reasonably track and the conversation may become unwieldy and not useful. This situation can be exasperated if some members post comments that are not at all related to, or only marginally related to, the topic at hand (e.g., spam).

SUMMARY

Various embodiments of the present disclosure are generally directed to a method and apparatus for applying reputation scoring to a group chat session in a computer network.

In some embodiments, the group chat session is displayed in the form of a visually perceptible conversation arranged as a sequence of communications by a group of users of network accessible devices. Each user has an associated reputation score generated responsive to at least one characteristic of a previous communication by the associated user. Each network accessible device displays each communication using a visual indicia selected in relation to a magnitude of the associated reputation score for the user who generated the communication. The visible indica can take a variety of forms such as different sizes of comments, different color schemes, different fonts, and so on.

These and other features and advantages of various embodiments can be understood from a review of the following detailed description in conjunction with the accompanying drawings.

DETAILED DESCRIPTION

Various embodiments of the present disclosure provide a mass communication on-line system to facilitate real-time, text-based conversations (group chats) with multiple geographically distributed users. The system may be implemented using one or more network accessible (client) devices for use by each of the participants (group members), and one or more remote servers that interconnect and communicate with the client devices. Other arrangements can be used, including a peer-to-peer arrangement where the functions identified as being carried out at the server level can instead be carried out by one or more of the local client devices.

A reputation score, also sometimes referred to as a relevance score or a judgment value, is assigned to each member of a particular chat group. This score can be generated and maintained in a variety of ways, including through the assignment of scores by an owner of the group chat, the analysis of various factors associated with the members, etc. The reputation score is intended to provide a relative measure of the contributions made by the member to the quality of the conversation as well as to the quality of past conversations.

The reputation scores influence the manner in which the various communications are displayed on the client devices during the course of a conversation. This differentiation among the comments allows the members to determine, at a glance, the relative merit of the respective comments being made during the conversation.

It is contemplated that the comments will be distinguished in some visually perceptible manner such as through the use of different sized text, different fonts, colors, the use of bold characters, icons, etc. Regardless of form, comments from members with better (e.g., higher) reputation scores will tend to be displayed in a relatively more prominent manner as compared to those comments from members having worse (e.g., lower) reputation scores.

To the extent that images or other attachments can be incorporated into the comments, different maximum sizes can be provided so that higher reputations allow the use of larger images, etc. Other variations can be implemented as well, such as metering the participation based on relevance in terms of allowable message length, the frequency at which new comments are permitted to be added to the conversation, etc. Image detection routines can be applied to images in an effort to characterize the style and relevance of the images to the conversation.

One practical result of linking message prominence to reputation score is that off-topic posts (e.g., spam) from frequent posters will tend to become relatively tiny within the viewing area of the client devices (e.g., small font, small max image sizes, etc.). For example, someone attempting to sell a phone during a class discussion would have their messages minimized or otherwise flagged, leading to fewer distractions during the conversation by those members attempting to follow and participate in the conversation.

In further embodiments, a filter mechanism can be used to filter the conversation based on the reputation scores of the members. For example, in a rapidly updated conversation involving a high rate of new comments, a user can filter out lower level communications from members having relatively lower reputations. This will tend to reduce the rate, and increase the relative quality, of new messages added to the conversation. Other filtering schemes can be used as well, such as selecting comments from members with reputation scores in some selected range. For example, a new member to the group may wish to initially only receive comments from other members with a similar reputation, etc. on the basis that comments from similar members may provide content more suited to their knowledge level regarding the topic of the conversation.

Further embodiments include an adaptive filter that monitors various parameters and automatically adjusts the rate at which new comments are displayed. Other factors can be taken into account in determining the display style and filtering, such as relative distance between members, etc. In some cases, a copy of the entire conversation is maintained locally, but only the filtered comments are displayed in real time. This can allow the user to go back later and review either those comments that were exempted from display, or the entire conversation.

The system can be set up to facilitate group chats in any number of different formats, including a chat room, a message board, a private message, a text message, etc. Any number of different sizes and styles of chats are envisioned, including private chats having as few as two members to public chats with several hundred or several thousand members or more.

In some cases, the group chat may be associated with a classroom setting so that the group chat owner is the instructor for a class and the members are students in the class. The conversation may be a continuous conversation that is periodically updated throughout the term of the class as different members add new comments, or the conversation can be broken up into segments that occur on a regularly scheduled rate (e.g., every Tuesday from 5:00 pm to 6:00 pm, etc.).

In other cases, the group chat may be an interest-based group for participants interested in a particular subject (e.g., sports, politics, hobbies, current events, philosophy, religion, music, art, celebrities, etc.). In still other cases, the group chat may form a part of a matchmaking (e.g., dating) site or other social media platform. The various embodiments can be adapted for substantially any topic and environment.

It is contemplated that the system will assign, monitor and adjust the reputation scores for all participants using a dedicated judgment circuit so that a single, objective set of reputation scores is applied to the system. In this case, each participant experiences the conversation based on the same set of reputation scores. Changes to the objective set of reputation scores will occur over time as a result of the operation of the judgment circuit, and all such adjustments will be applied to all participants.

In further embodiments, individual (non-chat owner) participants can be given an option to assign, monitor and/or adjust the reputation scores of one, some, or all of the participants. This allows a participant to generate a tailored set of reputation scores. The effects of a tailored set of reputation scores will generally be viewable only by the participant who generated the tailored set. It follows that different participants may experience the conversation in different ways through the use of multiple sets of tailored and/or objective sets of reputation scores.

If a participant assigns a low reputation score to a particular individual, communications may still be received from that individual as opposed to being blocked, but the types of restrictions discussed above (e.g., reduced font size, reduced image size, time restrictions on communications, etc.) will be applied to such communications from the individual with the tailored, reduced reputation score.

A participant may further have the option to have the tailored reputation score(s) be operable for a short time, for the duration of a current session, or implemented so that the tailored reputation score(s) continue to be applied during subsequent conversations. The judgment circuit can be instructed to modify tailored reputation scores as before, so that over time, with good behavior a reduced reputation score can improve. Alternatively, the judgment circuit can be instructed to allow the tailored reputation scores selected by a participant to remain in place unless instructed otherwise by the participant.

Figure 1:
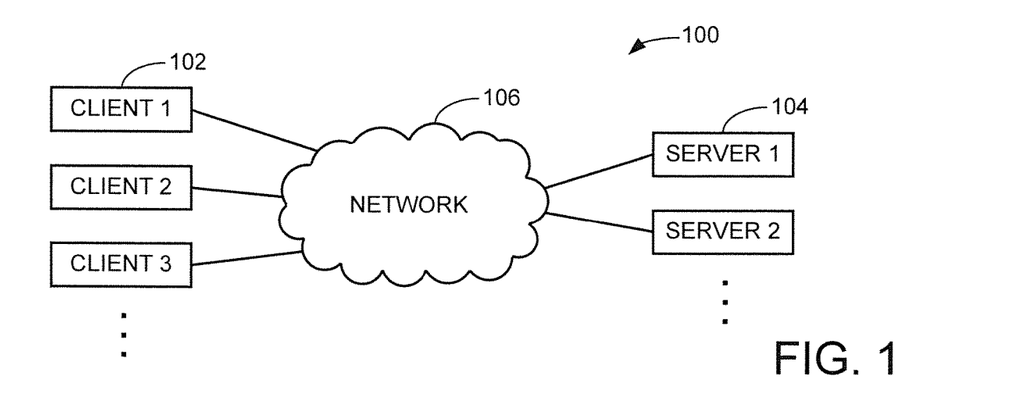
FIG. 1 shows a computer network system constructed and operated in accordance with various embodiments of the present disclosure.

These and other features and advantages of various embodiments of the present disclosure can be understood beginning with a review of FIG. 1 which shows a computer network system 100. The system is geographically distributed and includes a number processing nodes including client devices 102 and servers 104 that communicate via one or more intervening networks 106.

The client devices 102 can constitute substantially any form of network accessible device, including but not limited to a smart phone, a tablet, a laptop, a desktop computer, a workstation, a gaming system, etc. The servers 104 may provide processing and storage capabilities for the operation of a system level group chat application (app) that is executed using the system 100. The network can include the Internet, a local area network, a wireless network, and/or any other arrangement that facilitates wired and/or wireless communication link(s) between the various devices.

Figure 2:
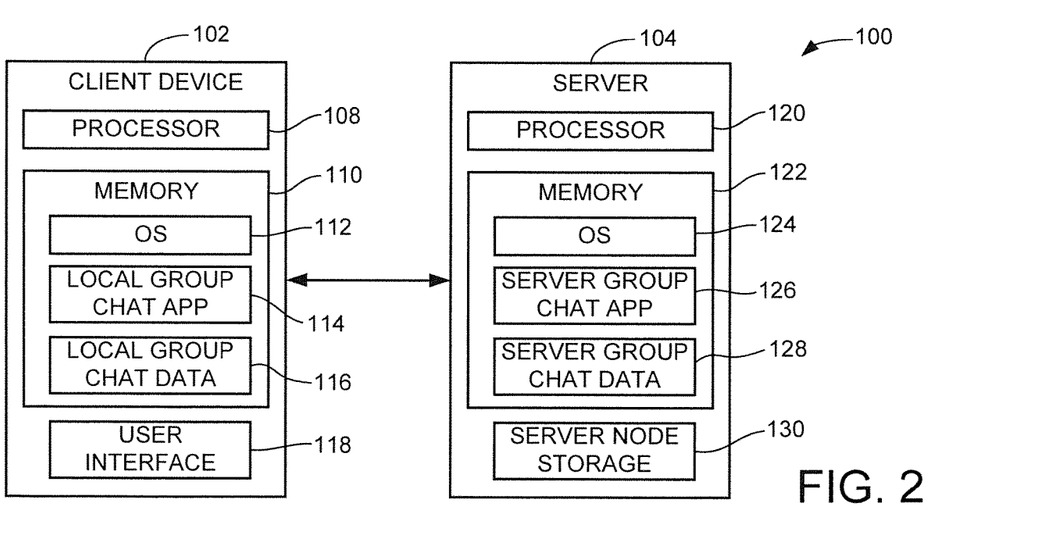
FIG. 2 is a functional block representation of a selected client device and server from FIG. 1 in some embodiments.

FIG. 2 shows a selected client device 102 and a selected server 104 from FIG. 1 in some embodiments. Other configurations can be used so this is merely for purposes of providing a concrete illustration and is not limiting. For purposes of the present discussion, it will be contemplated that the client device 102 constitutes a smart phone.

The client device 102 includes a programmable processor circuit 108 and an internal memory 110. Stored within the memory are various forms of programs and data accessed by the processor including an operating system (OS) 112, a local group chat app 114 and local group chat data 116. The local group chat app 114 can take any number of forms such as a web-browser based or separate API based application that, when executed by the user of the device 102, initiates participation in a group chat facilitated by the server 104. The local group chat data 116 provides various data collected and used by the app 114. A user interface 118 enables the user to interact with the app 114 such as through a touch screen display, a keypad, etc.

The server 104 includes one or more programmable processor circuits 120 and memory 122. The memory 122 stores a server OS 124, a server group chat app 126 and server group chat data 128 accessed by the processor(s). If the server operates as a storage node, server node storage 130 may also be used to provide non-volatile memory (NVM) for the storage of data associated with the chat app.

Figure 3:
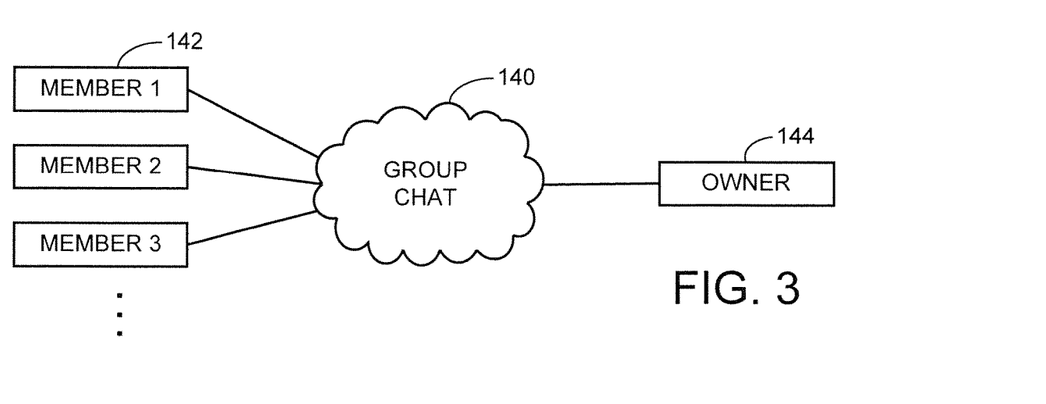
FIG. 3 depicts a group chat taking place using the devices of FIGS. 1-2 in some embodiments.

FIG. 3 illustrates an on-going group chat 140 between a number of members 142 and an owner of the group 144 as a result of the operation of the local chat group app 112 and the server group chat app 126. Each of the members 142 and the owner 144 utilize an arrangement such as in FIG. 2, with each participating in the group chat using a separate client device 102. In this sense, the group chat exists as an ongoing conversation that is displayed on each of the client devices. In some cases, each client device may display the group chat in a slightly different form, as explained below.

The members 142 may each undergo a registration process and select a username and a password or other credentials to uniquely identify the member when accessing the group chat. Real names, anonymous or pseudonymous usernames may be used as desired. However, even in a completely anonymous chat, the system will track the various users (e.g., login script, IP address, etc.) in order to maintain a reputation score for each. It is contemplated that the owner will have administrative privileges as is common with typical group chat applications, and thus can be viewed as a board owner (BO) or chat owner (CO) with the right to add new members, remove existing members, temporarily or permanently suspend members, make adjustments to reputation scoring levels, and so on. The inclusion of a board owner 144 is not necessarily required; in other embodiments, the chat may be freely joined by any number of participants and the system will monitor the ongoing conversation and begin assigning and adjusting reputations as required.

Figure 4:
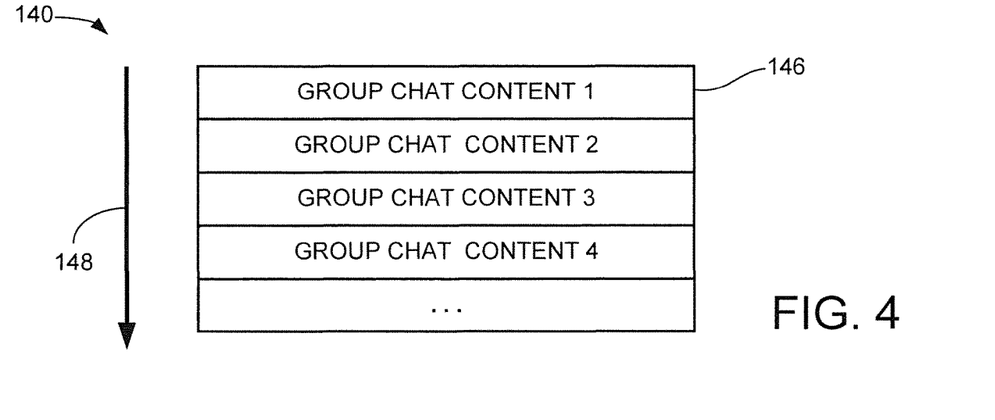
FIG. 4 is a rudimentary representation of a text-based conversation taking place during the group chat as different members add content in a sequential order.

FIG. 4 is a rudimentary depiction of the group chat 140 in FIG. 3 in the form of an ongoing conversation as displayed on a local client device such as in FIG. 2. The conversation is made up of sequential comments 146, each also respectively referred to as group chat content. It is contemplated albeit not necessarily required that each comment 146 will be a text-based string of characters that conveys a message generated by the associated member. However, the format of each message can take substantially any form including characters, icons (e.g., emojis, etc.), graphics, images, audio-visual (A/V) works such as movie clips, recorded sections of audio content, attached files, etc.

The comments 146 are displayed in a sequential order substantially related to the order in which the comments were generated and submitted to the group chat. Arrow 148 depicts elapsed time, so that in this conversation, group chat content 1 represents an earlier comment and group chat comment 4 represents a later added comment. Comments can be grouped and displayed for visual detection in substantially any suitable format. Comments by the local user may be in one color or have one form of marking to distinguish one's own comments as compared to comments from other members. Comments are further distinguished among the other members as will now be discussed beginning with a review of FIG. 5.

Figure 5:
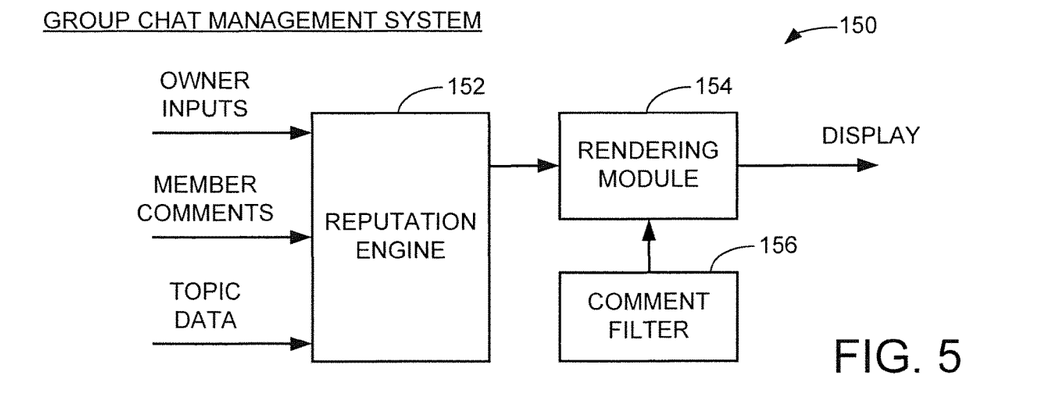
FIG. 5 is a functional block representation of a group chat management system implemented by the devices of FIGS. 1-2 in accordance with some embodiments.

FIG. 5 shows a group chat management system 150 constructed and operated in accordance with some embodiments. The system 150 may be realized by the execution of the respective group chat apps by the processor circuits in the local client devices and the server(s), although other arrangements can be used including hardware circuits, etc.

The system 150 includes various components including a reputation judgment circuit 152, a rendering module 154 and a comment filter 156. In some cases, the operations of the reputation judgment circuit, also sometimes referred to as a reputation engine, are carried out at the server level, while the rendering and filtering operations may be carried out locally at the client level.

Figure 6:
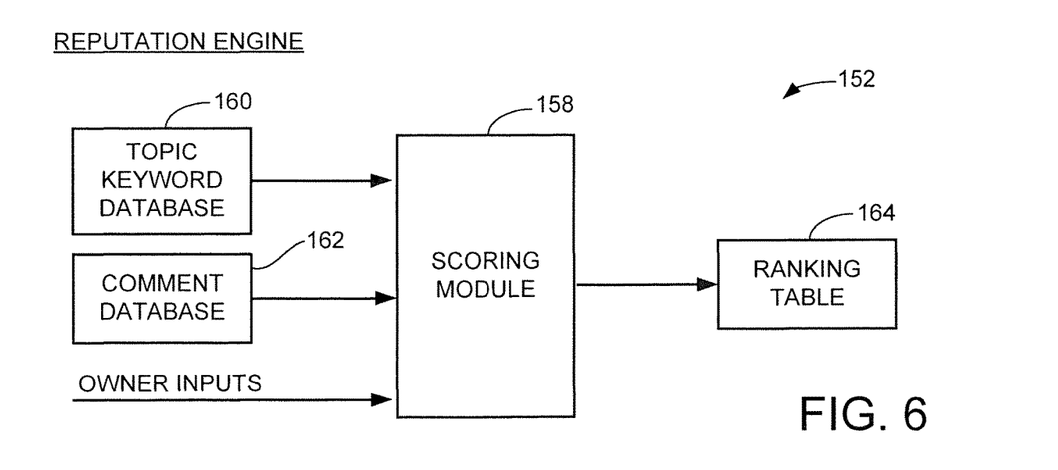
FIG. 6 depicts the reputation judgment circuit of FIG. 5 in some embodiments.

The reputation engine 152 can take a variety of forms. FIG. 6 shows one embodiment to include a scoring module 158, a topic keyword database 160 and a comment database 162. The scoring module 158 constitutes hardware and/or programmable processor circuitry that operates to assign and maintain a reputation (relevance) score for each member 142 of the group chat (e.g., see FIG. 3). In some cases, scores may be subjectively or objectively assigned by the owner 144. A baseline score may be initially assigned to each new member (e.g., 50% out of a range from 0% to 100%, etc.), after which the system adaptively adjusts this value up or down based on that member's performance.

The topic keyword database 160 can represent a data structure in a memory that lists keywords associated with a given topic. These can be loaded by the owner 144 or can be detected and added based on frequency of use during ongoing conversations. For example, a group chat related to a biology class may include keywords for terms and concepts being covered by the instructional materials being studied and covered in that class. Use of these terms by various members that include the keywords may result in a higher relevance being assigned to such comments.

The comment database 162 can be arranged as a data structure in a memory that lists a history of previous comments by each member. In some cases, statistical analyses such as artificial intelligence (AI) multi-dimensional analyses can evaluate the comments in view of the keywords and other factors to arrive at a reputation score for a given member.

In some embodiments, the scoring module 158 continuously evaluates the quality of the various comments so that a member with a relatively low reputation score may, over time, enjoy an increase in relevance (or vice versa). In some cases, intentionally humorous or sarcastic comments may be denoted as such by the commentor (using a tag such as /jk or /s), so that such comments do not inadvertently cost the commentor. As with in-person human interactions, judgments are made of the relevance of various contributions, and the system can be configured to take these types of judgments into account. As with real life, not every statement may not necessarily be intended to be taken seriously and/or literally.

A ranking table 164 provides a data structure in a memory that maintains a listing of the various members and the associated reputation scores. The members may be ranked from best to worst with regard to the associated scores. History data may be accumulated to show changes in the scores for each member over time. This data may be viewable by the owner and forwarded to individual members for self-assessment purposes.

Figure 7:
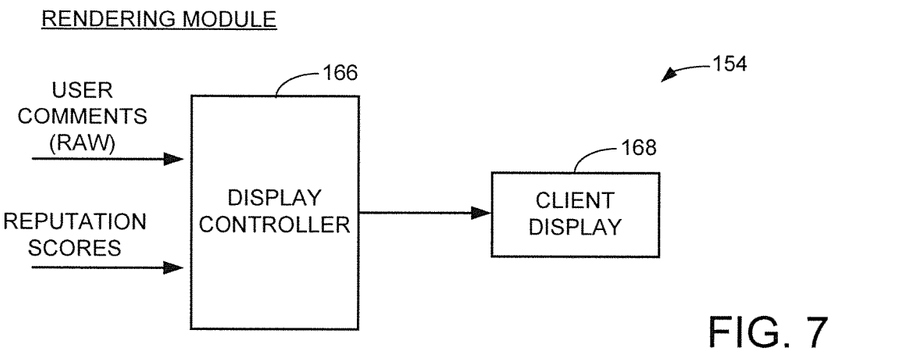
FIG. 7 shows the rendering module of FIG. 5 in some embodiments.

FIG. 7 shows a representation of the rendering module 154 from FIG. 5 in some embodiments. Other forms can be used. Unlike the reputation engine 152 of FIG. 6 which may be realized at the server level, the rendering module 154 represents programming and/or hardware circuitry operable at the client device level. Generally, the rendering module 154 includes a display controller 166 and a client display 168. The display controller operates as part of the local app to receive all user comments added to the conversation, as well as reputation scoring information from the ranking table 164.

From this, the controller renders the display of the comments based on the associated reputation scores associated with the various comments. The client display 168 forms a part of the local client device interface (see e.g., 118, FIG. 2) and may be a touch screen display of the exemplary smart phone, although other forms can be used (e.g., computer displays, etc.).

Figure 8A:
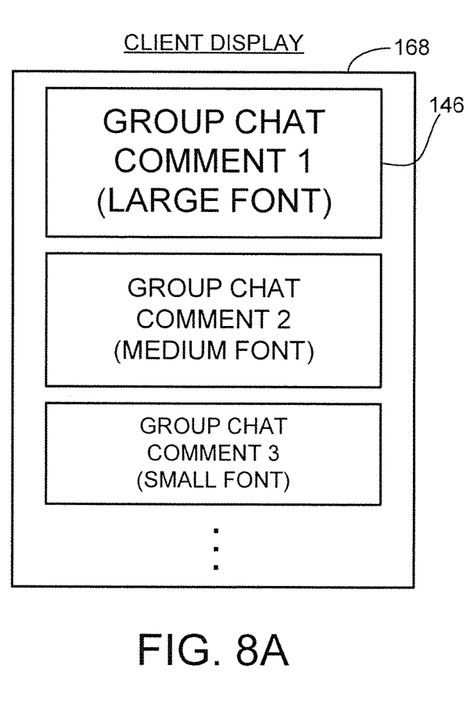
FIGS. 8A and 8B show different exemplary forms of client displays provided by the module of FIG. 7.
Figure 8B:
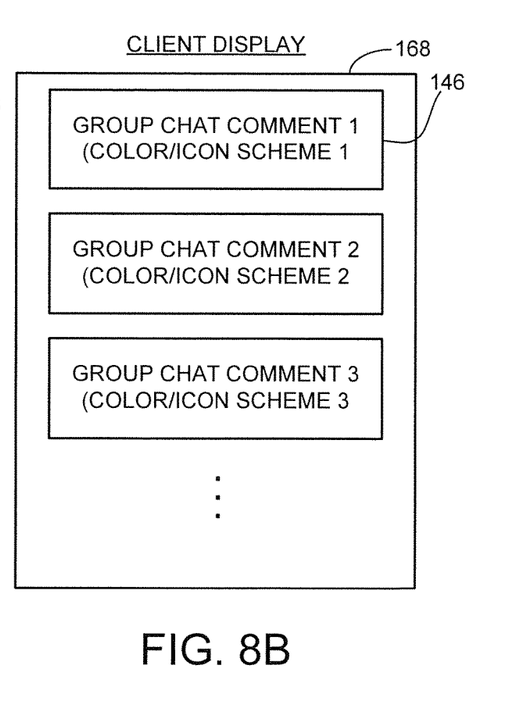

FIGS. 8A and 8B show the client display 168 in different embodiments. Other formats can be used. In FIG. 8A, different group chat comments 146 (see FIG. 4) are displayed using different sizes and (as desired) different fonts in relation to the relative scores. In this example, comment 1 comes from a member having a high reputation score, comment 2 comes from a member having a medium reputation score, and comment 3 comes from a member having a low reputation score.

FIG. 8B shows similar comments but with different color and/or icon schemes to denote the relative reputation scores. For example, comment 1 may be more stark or easier to read as compared to the color scheme used for comment 3. Any number of different forms of visual distinctions can be used as desired so that these are merely exemplary and are not limiting.

At this point it will be noted that the reputation scoring can take any number of suitable forms depending on a particular environment. The rankings may be absolute or relative. In one example, a sliding scale of from 0% (worst reputation) to 100% (best reputation) may be used (or vice versa). In other embodiments, relative rankings may be used so that, in a group chat of 50 members, the members will be ranked from first to fiftieth, etc. In a classroom setting, a student's current class average may be a factor that is taken into account in assigning the associated reputation score.

While it is contemplated that the owner has the ability to set or adjust the reputation scores, the system can be alternatively configured such that the system itself determines all scores heuristically. In other embodiments, members may be given the option to provide input to influence the scores of other members. It is contemplated that the owner may be assigned and will retain the highest score automatically on the basis that the owner is the leader of the discussion or otherwise owns the board, but this is not necessarily required.

The displays in FIGS. 8A and 8B are intended to represent a group chat in which all of the members have access. In further embodiments, subgroup discussions, such as private chats can be established between members or between one or more of the members and the owner. In this case, the communications can use a similar display system, or the comments can be shown in a consistent manner (e.g., same font size, etc.). For example, if a struggling student is having difficulty obtaining attention from the instructor, a private chat may enable that student to initiate a side conversation to address specific issues.

Figure 9:
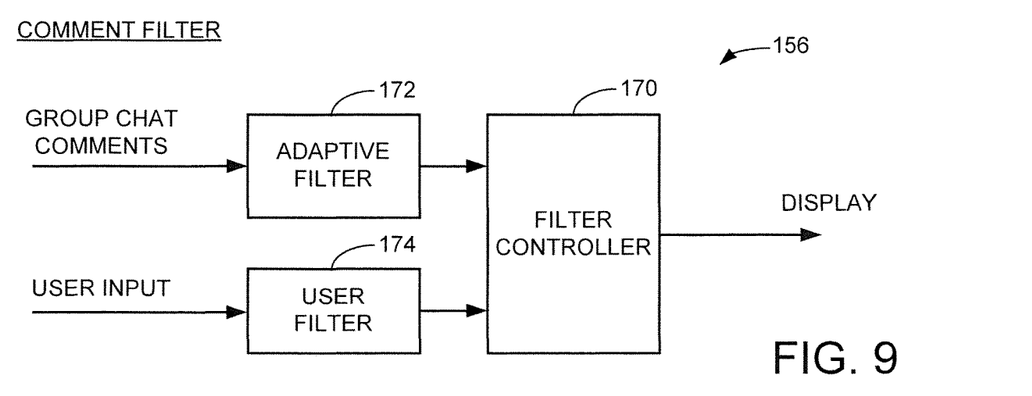
FIG. 9 shows the comment filter of FIG. 5 in some embodiments.

FIG. 9 illustrates the comment filter 156 from FIG. 5 in some embodiments. It is contemplated that the comment filter will form a portion of the local app, although such is not necessarily required. The filter 156 includes a filter controller 170, an adaptive filter 172 and a user filter 174.

The filter controller 170 operates to restrict the number of comments being displayed on the local device. As noted above, the entirety of a given conversation may be stored locally on the client device, with only a subset of the comments being displayed during the course of the conversation.

The adaptive filter 172 can be operated to automatically throttle the rate at which new comments are displayed on the client display. This can address situations where so many comments are being added at once that it is difficult for the local user to track the course of the conversation. By selecting those comments from users with the highest reputation scores for display (and omitting those comments associated with lower scores), the overall quality and flow of the conversation can be substantially maintained at a user selectable or automatically selected level.

The user filter 174 allows the local user to adjust the operation of the filter controller. In some cases, the user filter can allow the local user to identify certain commentors that should have their comments displayed irrespective of the associated reputation score. In other cases, the user filter can allow the user to select a particular range of reputation scores for display.

Figure 10A:
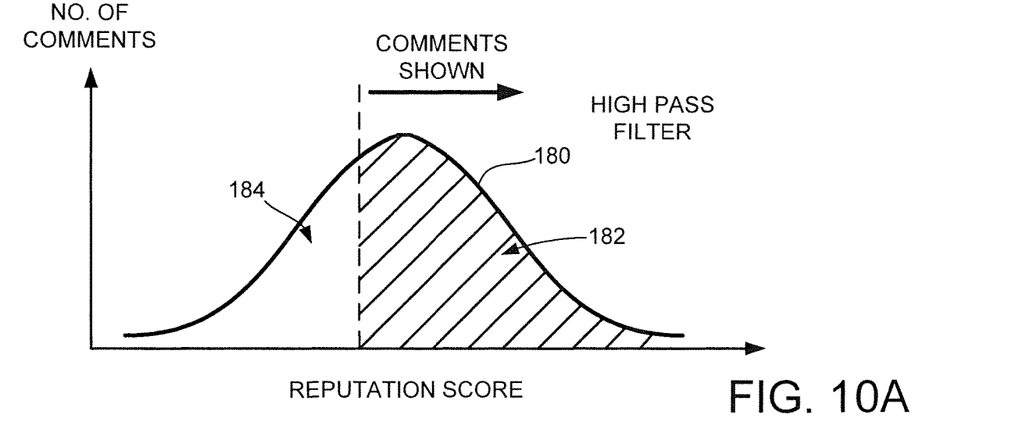
FIGS. 10A and 10B show graphical representations of the operation of the comment filter in some embodiments.
Figure 10B:
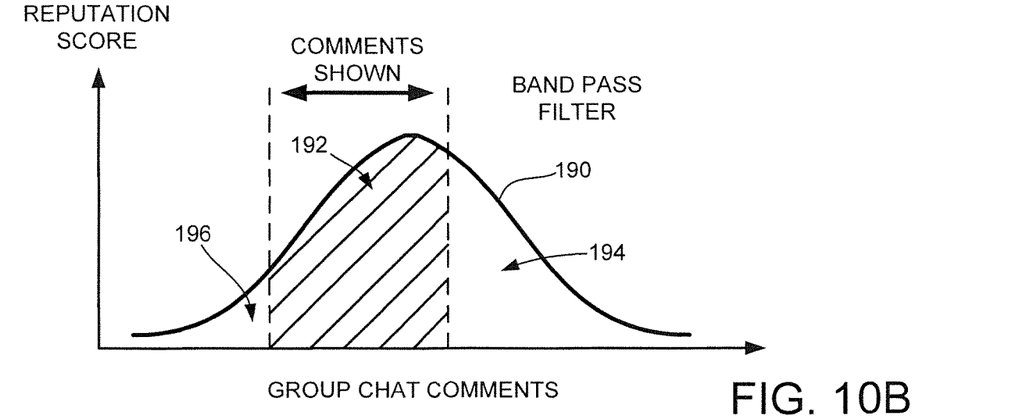

Two such ranges are illustrated in FIGS. 10A and 10B. FIG. 10A shows a comment curve 180 that generally represents accumulated comments 146 obtained over the course of an extended conversation based on reputation score. While the waveform of the curve 180 is shown to be substantially Gaussian, other waveforms may be experienced since the frequency of commenting may not necessarily be uniform across all members; indeed, a skewed waveform may be more likely since commentors with higher scores may tend to comment more frequently. Nevertheless, the waveform of curve 180 is sufficient to illustrate the operation of the user filter.

As shown by FIG. 10A, the user can select a cutoff value at a given reputation score magnitude, so that comments at or above this level are displayed, as indicated by hatched region 182. Conversely, lower scored comments are omitted from display, as represented in blank region 184.

In some cases, the user may dial the score setting up or down based on current comment rate to obtain the desired conversation characteristics. For example, should a large number of irrelevant comments suddenly begin to appear within the conversation, these comments can be filtered out by setting an appropriate relevancy level. It is noted that instead of having to individually identify and filter out each member by username or comment, the user can simply set a relevance level, causing all lower level comments to be omitted at once. Existing lower level comments can remain in the thread or be immediately removed from view.

FIG. 10B shows a similar comment curve 190 in which the local user can use the user filter 174 to select a particular range of comments for display, as depicted by hashed region 192. Comments in upper and lower regions 194, 196 are omitted. This can be useful, for example, when the user desires to see comments from a particular band of similarly ranked members. The owner 144 may wish to use this feature to determine how students in a particular sector are addressing the subject matter.

Figure 11:
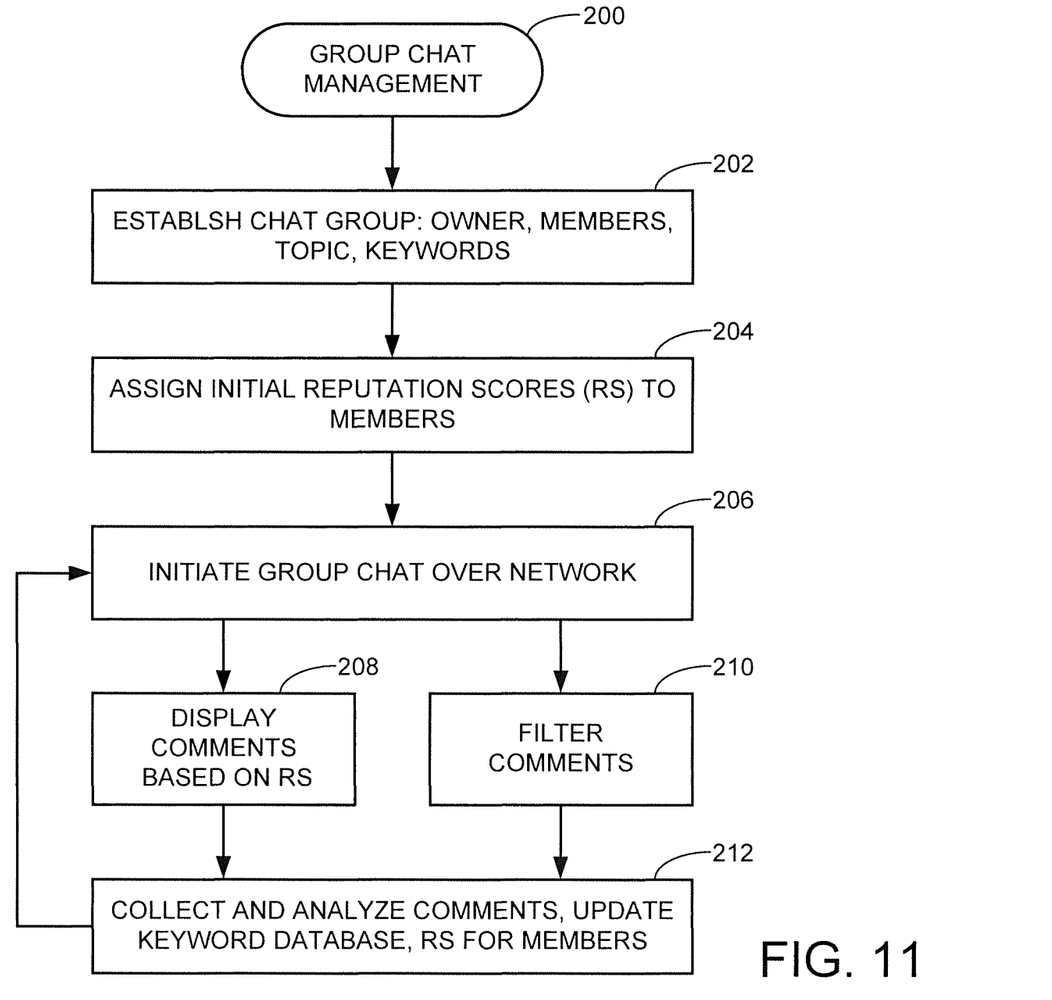
FIG. 11 is a flow chart for a group chat management routine.

FIG. 11 is a flow chart for a group chat management routine 200 to summarize the foregoing discussion. The routine 200 may represent programming steps carried out by the respective local and system level group chat app routines of FIG. 2. The various steps are merely illustrative and may be modified, appended, performed in a different order, etc.

At step 202, the routine establishes a chat group, including the selection of various elements including the owner 144, the members 142, the topic, relevant keywords, etc. In some cases no separate owner will be present, as the chat will be a peer-to-peer arrangement.

Step 204 shows the assignment of initial reputation scores (RS) to the various members of the group chat. As noted above, this can be performed by the group owner, or these can be baseline values, etc.

The group chat (e.g., 140, FIG. 3) is thereafter initiated at step 206. As discussed above, this will develop a conversation that begins to appear on each of the client devices associated with the chat. The conversation may be separately logged and stored on the respective devices and/or the server.

During the course of the conversation, comments will be displayed on the respective client devices based on the reputation scores, as indicated by step 210. Concurrently, as desired, filtering may be applied at the individual client devices so that different ranges of comments may appear on different client devices, step 210.

Finally, step 212 shows the collection and analysis of various comments during the course of the conversation by the individual members. As required, the various reputation scores may be adaptively adjusted up or down. In this way, during the course of a given conversation a given user may see their own comments becoming decreased in size or otherwise marked. Initially, these changes may be reflected only locally, giving the local user a chance to correct the situation before the reduction in scoring is reflected in the other member's screens. These and other features can be readily implemented based on the foregoing discussion.

Figure 12:
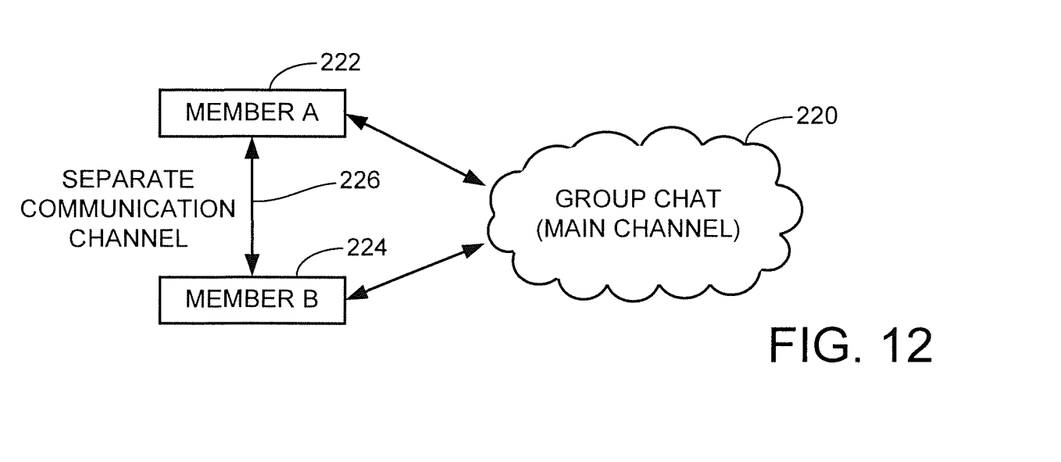
FIG. 12 shows the use of a separate channel that may be established during a group chat in accordance with further embodiments.

FIG. 12 shows another group chat 220 similar to the group chats discussed above. In this group chat, at least two members (users) 222, 224 are participating out of a larger group of members. These two members are respectively identified as Member A and Member B. The group chat 220 constitutes a main communication channel through which these members may communicate with each other, as well as with other on-line members of the group during the course of the group chat.

A separate communication channel is denoted at 226. This channel may take the form of a private chat, an IM (instant message), etc. between the respective members 222, 224. More than just two members may participate, although it is contemplated that less than all of the members will participate in this separate conversation during the course of the main channel communications of the group chat 220. The separate communication channel 226 may pass through the same network as the main channel 220, or use a different channel.

In some embodiments, members can only send/receive messages that fall within some reputation score range. The reputation score can be that of the sender, the receiver, or both. For example, Member A may be only permitted to send messages to receivers having a certain score, such as 95%; in other words, Member B would need to have a reputation of at least 95% in order to receive the message. In another example, in order for Member A to be able to successfully send a message to Member B, Member A would have to have a reputation score of some minimum value (such as at least 95%). In other examples, both Members A and B would have to have reputation scores within some range in order to be able to communicate via this separate channel 226.

The reputation scores can be used to provide a measure of the trustworthiness of individual contributors. As members establish reputations within the group, higher levels of trust may be generated, allowing the ability to develop various trust boundaries. Other factors not necessarily related to the comments made by members can also be used in generating and maintaining the individual member reputation scores, such as the behavior, actions and/or performance of the various members away from the group chat. While a single reputation score has been shown for each member, multiple scores can be used for each member, such as different scores for different groups or different scores for different sets of criteria within a given group. This can help to differentiate levels of expertise, preference, etc. among the individual members.

In further embodiments, a separate communication channel is not required as shown in FIG. 12; rather, embedded communications can be provided within the main group chat. For example, each of a subgroup of the members can communicate in such a way that separate comments from/to each of the subgroup members appear in the normal conversation, but these are only viewable by those subgroup members. In such case, the filtering does not take place on the client side, but rather on the server side, and it is not based on the sender's relevance, but instead on the recipient's relevance.

The filter on the client side is for the convenience of the user (reducing the irrelevant information). This additional filtering on the server side considers the recipient's relevance as a security feature, which prohibits non-relevant participants from accessing the information. Implementing this at the server level can eliminate the ability of the clients to tamper with and gain access to the information.

In some cases, a message metadata can be simplified to consist of at least the following information:
SenderID|GroupID|Messages relevance value|Minimum participant's relevance threshold necessary to receive In this way, the messages will be correctly routed to the intended recipients. Thus, filtering including high/low pass filtering can take place on the server and/or the client side as required, and the filtering can further be carried out based on the channel specific relevance of the sender and/or the recipient.

In still further embodiments, activity modules such as games (e.g., "mini games") can be embedded in the channel/group. All manner of games (or other activities) are envisioned, including action, racing, quizzes, etc. Games can be single player or multi-player. The outcome of the games can be automatically posted to the channel, or through user selection. The outcome of the games can further be used as an input to the reputation scores of the various members; for example, proficiency in a particular activity may serve to raise the reputation score of a particular member. The games can even be arranged to play for stakes, such as money or points (where permitted by law). The activities may be viewed as a form of plugin that can be developed by third parties to the supplier of the main group chat software (app).

Figure 13:
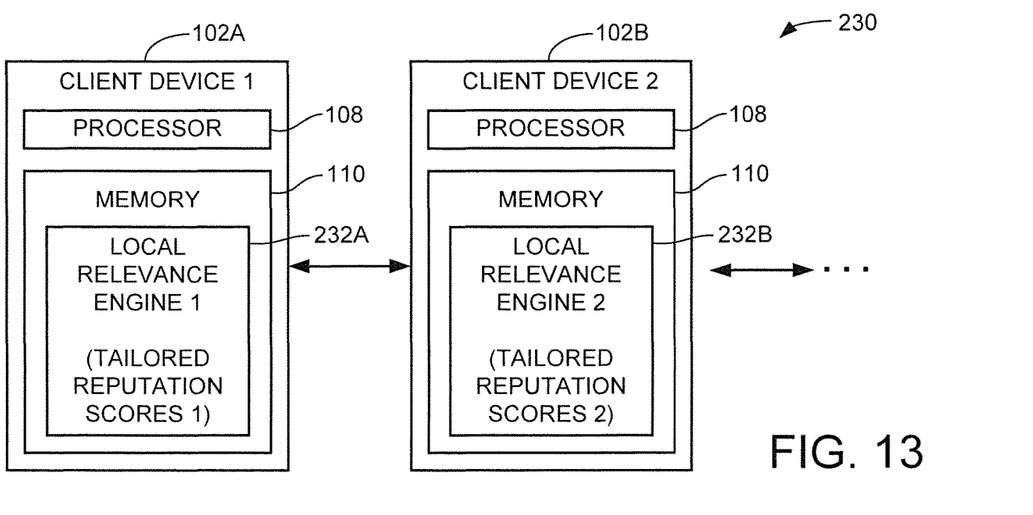
FIG. 13 is a functional block representation of a peer-to-peer group chat arrangement carried out in accordance with further embodiments.

FIG. 13 shows yet another system 230 in which a group chat is carried out in accordance with further embodiments. The system 230 provides a peer-to-peer group chat for users having associated network accessible devices, as opposed to a server based system as discussed above in FIG. 2. Two user devices in FIG. 13 are denoted at 102A and 102B. Each device may operate as described above, except that the relevance engine functionality is disposed in one or more of the respective user devices. As shown in FIG. 13, each user device may have a separate relevance engine, such as shown at 232A and 232B. These may be realized via software executed by the local device processor 108 and stored in the local device memory 110. In this case, different tailored sets of reputation scores can be generated by each user.

Figure 14:
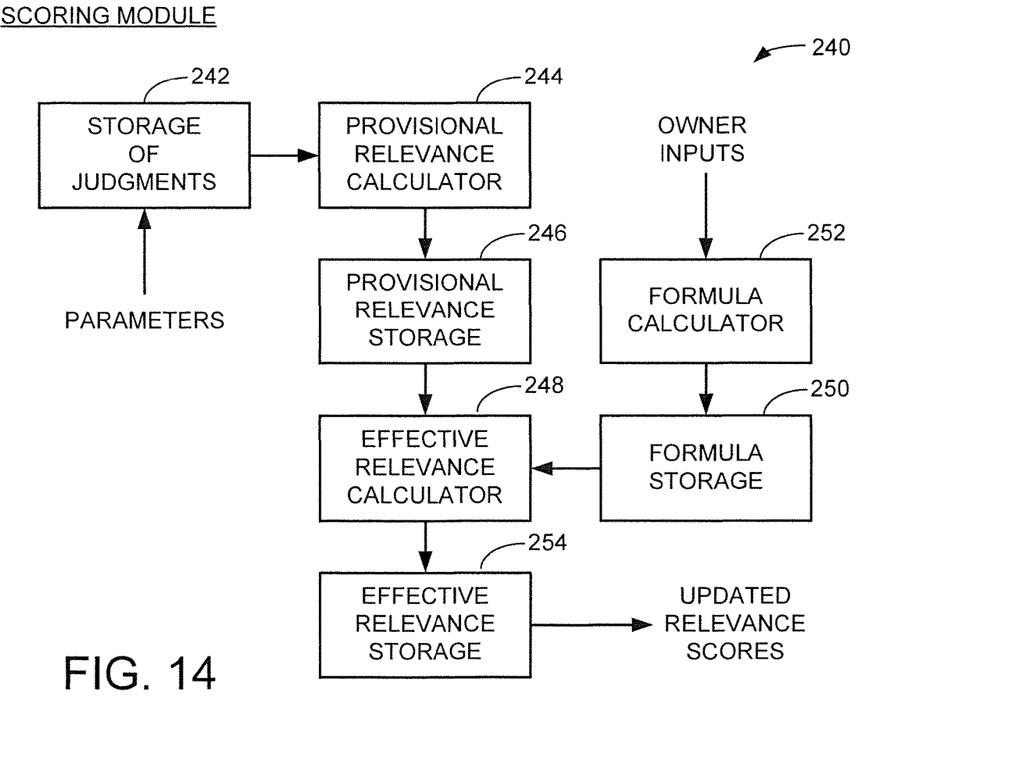
FIG. 14 is a functional block representation of a reputation judgment circuit in accordance with further embodiments.

FIG. 14 shows a functional block representation of a scoring module 240 similar to the scoring modules discussed above. The module 240 can be realized in hardware and/or programmable processing circuits as desired.

The module includes a storage of existing judgments (reputation scores) as represented at block 242. This represents the scores for all users in the system. A change or addition of a judgment triggers a calculation by a provisional relevance calculator block 244. This block operates to recursively calculate a provisionally relevance per channel based on the hierarchical structure of judgments, e.g., a network of trust.

The result of this calculation is stored in a provisional relevance storage block 246. The arrival of the new calculation triggers a calculation in an effective relevance calculator block 248, which takes a formula describing the relationship between different kinds or qualities of judgments stored in a formula storage block 250 and supplied by formula calculator 252, and calculates based on this input recursively the effective relevance of a user on a channel and stores it into an effective relevance storage block 254.

This processing by the effective relevance calculator 248 can also be triggered by changing a formula in the formula storage block 250. A client can query the effective relevance score from the effective relevance storage block 254.

Figure 15:
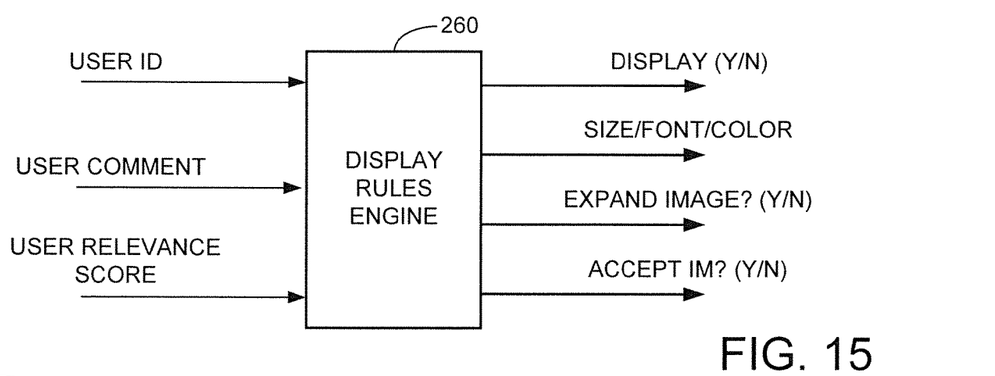
FIG. 15 shows a functional block diagram for a display rules engine circuit that can be used by a network accessible device to display comments in some embodiments.

FIG. 15 shows a display rules engine circuit 260 in accordance with further embodiments. The circuit 260 can be realized in hardware or via a programmable processor, and may form a portion of the display controller circuit 166 of FIG. 7. The circuit 260 applies selected rules regarding the manner in which comments are displayed on the display device of the network accessible device. The rules are applied to each user comment received by the device pending display based on various inputs, including the comment itself, the User ID of the user that authored the comment, and the relevance score of the author. In response, the rules will determine, based on the magnitude of the user relevance score, whether the comment is displayed at all; the size, font and/or color scheme to be used to display the comment if the comment is displayed; whether certain actions can be taken with respect to the comment, such as whether embedded graphical images (e.g., *.gif, *.png, *.jpg, *.mpg, etc.) can be expanded or activated; and whether private (instant type) pop up messages can be accepted by the author. The rules can form a portion of the loaded app, can be transmitted from the server, or can be customized by the local user of the network accessible device.

Figure 16:
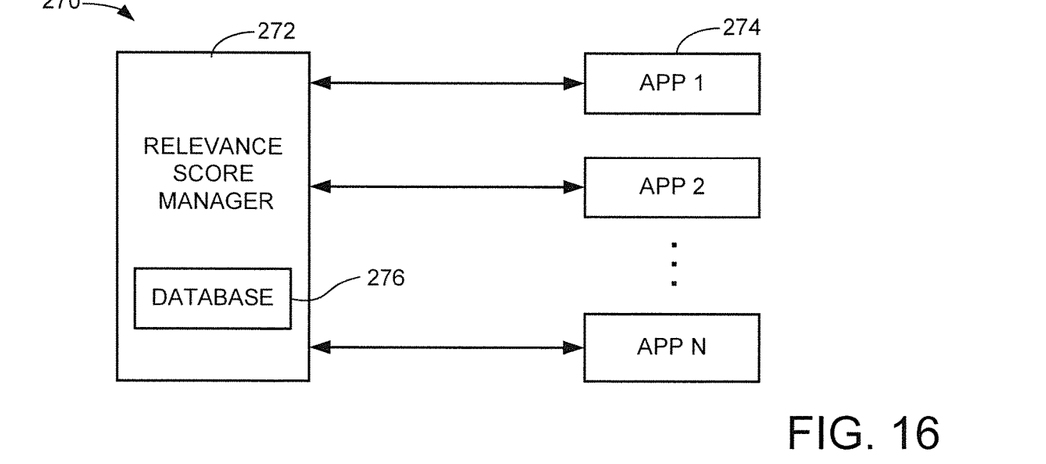
FIG. 16 is a functional representation of a system including a relevance score manager circuit at a remote server level that accumulates, processes and distributes relevance values among a number of different applications (apps) in further embodiments.

FIG. 16 shows a processing system 270 in accordance with further embodiments. The discussion thus far has generally contemplated that the relevance scores can be generated and applied for users of a single platform, such as a group chat application. FIG. 16 shows a relevance score manager circuit 272 for a suite of different applications (apps) 274, denoted as Apps 1 through N. The apps 274 may be any number of different types and styles of apps in which communication can take place among remote users. Examples include chat apps, games, office suites, search engines, social media apps, dating apps, etc. Hence, it will be understood that each of the apps 274 may be loaded to each of the network accessible devices in a network and accessed as required by the users of the devices.

A consolidated relevance score can be established for the performance of each user across these different apps based on feedback supplied to the relevance score manager 272 by the respective apps 274. The consolidated relevance scores can thereafter be stored in a database 276 as a data structure in a memory, and forwarded to the respective devices as the various apps 274 are subsequently executed by the users.

Figure 17:
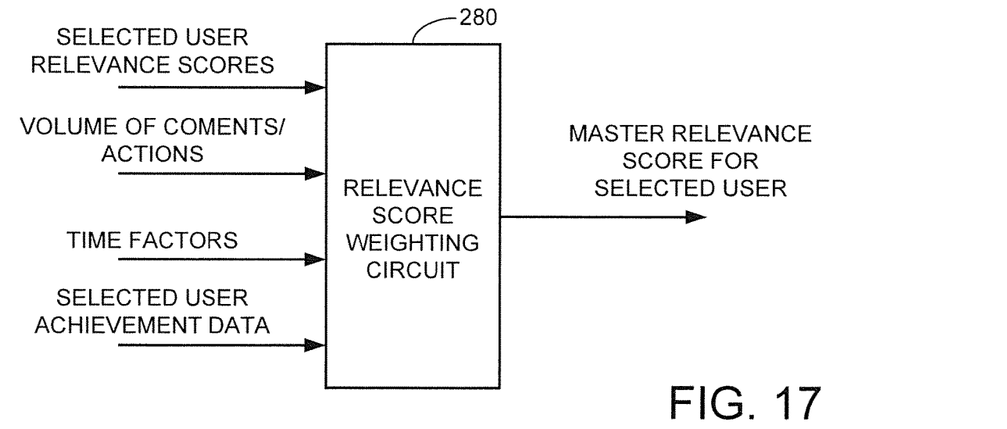
FIG. 17 shows a relevance score weighting circuit from FIG. 16 that generates a combined (master) relevance value for each user in the system in further embodiments.

FIG. 17 shows a relevance score weighting circuit 280 in further embodiments. The circuit 280 may form a portion of the manager circuit 272 of FIG. 16, and can be realized in hardware or programmable processing circuitry. It is contemplated the circuits 272, 280 will be provided at the remote server level to facilitate communication of information to the various network accessible devices.

The circuit 280 operates to receive a number of different inputs relating to the performance and behavior of the various users in the system. For example, for a selected user the circuit 280 can receive relevance score(s) for that user, as well as an indication of the usage rate of actions taken in the system by the selected user such as volume of comments, actions, etc. Time factors can be supplied as well, such as the relative amount of time that the selected user has operated various apps, how recently the apps have been activated, and so on. Other factors can be used as well, such as a measure of proficiency or achievement demonstrated by the selected user. For example, in a game app information relating to various achievements obtained by the selected user may be incorporated into the analysis.

Using these and other factors, the weighting circuit arrives at a consolidated, or master relevance score for the selected user. This score can be updated to the database and thereafter used by the various apps 274. In this scheme, individual apps may generate individual relevance scores which are used as a factor toward the master relevance score, but issues such as lack of experience in a particular app may help the selected user rather than penalize the user if the user is proficient and well behaved in other app environments.

A number of additional alternatives are contemplated. With regard to the rehabilitation of a user having a low relevance score, it is contemplated that in most cases, the natural operation of the system with regard to voting and judgment will serve to allow improvements over time. The system administrator can, of course, elect to make an adjustment to an individual, which in turn will trigger a recalculation that reflects the new input. Additionally, some systems may allow an operation referred to as "promoting" or "pimping" a message. For example, if User A has a low reputation and User B has a high reputation, User B may think that a message from User A is important. User B may be given the ability to "star" or "pimp" the (single) message, which gives it the same reputation as User B (that is, the message from User A is displayed with the same prominence as if the message came from User B).

Recalculations can take place due to a number of factors and events as described above. Generally, relevance on a channel is determined by first, judgement of users on the channel; second, formula (e.g., the amount of influence of other channels); and third, the relevance on this other (referenced in the formula) channels. It is contemplated that any change to any of these will trigger a recalculation. For example, if Channel A has an input via its formula from channel B, and a change occurs to the first or second factors above (e.g., judgment by other users or formula) on channel B, a recalculation on channel A will be also triggered. This may continue down for all references (e.g., channel X which takes a reference from channel A, and so on like in a tree, but of course not in circles). It follows that changes in external events can result in the triggering of a recalculation, provided that such events affect one of the factors listed above.

The system as variously disclosed herein provides a number of advantages and benefits over the existing art. Providing reputation (relevance) scoring enables each participant in the conversation to visually assess, at a glance, the relative merit of the various comments. Feedback is provided through this system, and larger groups of participants can be involved in an ongoing chat while not lessening the quality of the discourse.

The filtering aspects provide further abilities to ensure that the desired content of a given conversation is tracked and displayed to the intended recipients. Separate side channel communications such as in the form of private messages among a subset of the members can be established based on the respective reputation scores of the sending and/or receiving members. The side conversations can also or alternatively be embedded within the existing group chat conversation. Activities such as mini games can be used to enhance reputation scores or for other purposes related to the group.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising displaying, on a network accessible device, a group chat session in the form of a visually perceptible conversation arranged as a sequence of communications by a group of users including a local user of the network accessible device and a plurality of remote users, each of the local user and each of the plurality of remote users in the group of users having an associated reputation score generated responsive to at least one characteristic of a previous communication by the associated user, each of the communications displayed on the network accessible device having a visible indicia that indicates, to the local user, the associated reputation score in relation to a feature of the communication as displayed, wherein a content of each communication in the sequence of communications by the group of users remains a portion of the group chat session without removal therefrom but is displayed with a different prominence to each of the local user and each of the plurality of remote users in relation to the associated reputation score of the associated user, the method further comprising engaging a filter mechanism, by the local user via a user interface of the network accessible device, so that each communication displayed on the network accessible device of the local user requires the associated user in the group of users who authored said each communication to have an associated reputation score that meets or exceeds a selected minimum threshold, the filter mechanism rejecting from display additional communications from users in the group of users who have an associated reputation score below the selected minimum threshold.

2. The method of claim 1, further comprising a step of further engaging the filter mechanism, by the local user via the user interface of the network accessible device, so that each communication generated by the local user is only displayed on a remote network accessible device of a selected remote user of the plurality of remote users if the selected remote user has an associated reputation score that meets or exceeds a second selected minimum threshold.

3. The method of claim 1, wherein the users are respectively characterized as members of the group chat, and wherein the method further comprises a step of attempting to establish a separate conversation between at least two of the members participating in the group chat, the separate conversation initiated by a sending member of the group chat and received by a receiving member of the group chat, the separate conversation established responsive to at least one of the sending member or the receiving member having an associated reputation score at or above a first selected threshold, wherein the separate conversation is prohibited responsive to at least one of the sending member or the receiving member having an associated reputation score at or below a second selected threshold below the first selected threshold.

4. The method of claim 1, wherein the group chat session is characterized as a current group session and the associated reputation scores are characterized as current reputation scores, wherein the method further comprises using a judgment circuit which generates, responsive to at least one data struture stored in a memory that lists prior communications by each of the group of users in one or more prior group chat sessions, an initial reputation score for each user in the group of users, and which updates the initial reputation score for each user in the group of users responsive to the communications issued during the current group session to generate the current reputations scores.

5. The method of claim 1, wherein the visual indicia comprises a font size adjustment that is applied to the content of each communication on the display device in the displayed conversation, wherein communications from a first user having a better reputation score are displayed using a larger font size and communications from a second user having a worse reputation score are displayed using a smaller font size.

6. The method of claim 1, wherein the visual indicia comprises a size of an embedded graphical image that forms a portion of at least the content of at least one of the communications, wherein communications from a first user having a better reputation score are displayed using a larger graphical image size and communications from a second user having a worse reputation score are displayed using a smaller graphical image size.

7. The method of claim 1, wherein the visual indicia comprises a color scheme assigned to the content of each communication, wherein communications from a first user having a better reputation score are displayed using a first color scheme with a larger contrast and communications from a second user having a worse reputation score are displayed using a second color scheme with a smaller contrast.

8. The method of claim 1, wherein the associated reputation scores are characterized as an objective set of reputation scores based on inputs from an owner of the group chat session, wherein a first user adjusts at least one of the reputation scores in the objective set of reputation scores for a second user to provide a tailored set of reputation scores, and wherein the communications displayed on the network accessible device of the first user from the second user are displayed with visual indicia determined by the tailored set of reputation scores, and wherein the communications displayed on the network accessible device of the second user from the first user are displayed with visual indicia determined by the objective set of reputation scores.

9. A method comprising:
connecting a plurality of network accessible devices using a network;
displaying, on a display of each of the network accessible devices, a group chat session in the form of a visually perceptible conversation arranged as a sequence of communications by a group of users associated with the network accessible devices, the group chat session having an associated topic;
generating an associated relevance score for each user in the group of users responsive to a relationship between the communications from each user and the topic where a better relevance score is generated for communications having a greater relationship to the topic and a worse relevance score is generated for communications having a lesser relationship to the topic, the relevance scores stored in an associated memory of each of the network accessible devices;
adjusting, on the display of each of the network accessible devices, a visual indicia of a content of each subsequent communication during the group chat session from each of the users in relation to a relative magnitude of the associated relevance score for the user associated with the subsequent communication;
modifying the relevance score for at least a first user responsive to a first selected communication by the first user during the group chat session, the first selected communication displayed on each of the displays of the network accessible devices using a first indicia format;
displaying, on each of the displays of the network accessible devices, the content of a second selected communication from the first user using a different, second indicia format selected responsive to the modified relevance score for the first user; and
engaging a filter to assign a minimum required relevance score for recipients of communications from a second user so that only a first portion of the users having associated relevance scores that meet or exceed the minimum required relevance score are able to have the communications from the second user displayed on their associated network accessible devices, and wherein a remaining second portion of the users having associated relevance scores that are below the minimum required relevance score are not able to have the communications from the second user displayed on their associated network accessible devices.

10. The method of claim 9, further comprising generating a list of key words associated with the topic and storing the list of key words in a first memory, generating a list of used words by each user during the group chat session and storing the list of used words in a second memory, statistically comparing the list of used words in the second memory to the list of first words in the first memory to determine a usage count of each of the list of key words appearing in the list of used words for each user, and generating the associated relevance score for each user based on the usage count for each user.

11. The method of claim 9, wherein the first and second indica formats comprise at least a selected one of different fonts, different font styles, different sizes of comments, different color combinations of words in relation to a background, or different sizes of embedded graphical images that are applied to the content of the respective communications.

12. The method of claim 9, wherein the filter mechanism is further configurable by the second user such that only communications from users having associated relevance scores that meet or exceed a second minimum required relevance score are displayed on the network accessible device of the second user, and remaining communications from remaining users having associated relevance scores that are less than the second minimum required relevance score are not displayed on the network accessible device of the second user.

13. A non-transitory computer program stored in a non-volatile memory comprising program instructions configured to, when executed by at least one programmable processor circuit of a network accessible device:
store, in a memory of the network accessible device, electronic messages received over a network from participants in a group chat session;
access a data structure stored in the memory of the network accessible device comprising a set of relevance scores each having a magnitude indicative of an assigned reputation for each of the participants based on previous electronic messages transferred to the network accessible device;
for each electronic message in the memory, identify the participant who generated the associated message, identify the corresponding relevance score for the participant, compare the corresponding relevance score to a minimum acceptable relevance score threshold, and mark the electronic message for display if the corresponding relevance score meets or exceeds the minimum acceptable relevance score threshold or flag the electronic message for non-display if the corresponding relevance score does not meet or exceed the minimum acceptable relevance score; and
display each marked electronic message from the memory on a display device of the network accessible device in a selected order corresponding to a sequence in which the electronic messages were received by the network accessible device to form a visual representation of the group chat session, each electronic message having an associated content that is displayed in the selected order using at least a selected one of a different size, style or color in relation to the associated relevance score for the participant associated with the electronic message.

14. The non-transitory computer program of claim 13, further configured to receive the set of relevance scores across the network from a remote server, store the relevance scores as the data structure in the memory, receive at least one updated relevance score for a selected participant from the remote server store the at least one updated relevance score in the data structure, and subsequently use the at least one updated relevance score to adjust the configuration of an associated electronic message from the selected participant.

15. The non-transitory computer program of claim 13, wherein the group chat session is characterized as a current group session and the associated reputation scores are generated responsive to the current group chat session as well as at least one prior group chat session.

16. The non-transitory computer program of claim 13, further configured to modify, through an input supplied by the user of the network accessible device, the relevance score of at least one participant.

17. The non-transitory computer program of claim 13, wherein the network accessible device is a local network accessible device, the program further configured to transmit comments from the user of the local network accessible device only for display on remote network accessible devices of selected participants in the group chat, the selected participants each having an associated relevance score that meets or exceeds a second minimum acceptable relevance score threshold.

18. A system comprising a remote server comprising a programmable processor circuit and associated programming instructions in a server memory, the remote server configured to establish a group chat session among a plurality of users of a corresponding plurality of network accessible devices so that a sequential conversation of comments from the respective users are routed through the remote server and transferred for display in a time sequential order on each of the network accessible devices, the remote server further configured to generate a relevance score for each of the users responsive to a comparison of terms appearing in the comments from each to a list of key words associated with the group chat session, each relevance score indicating a relative measure of the relevance of the comments by the associated user to the group chat session, the remote server forwarding the relevance score with each subsequent comment by each user to the network accessible devices, the remote server maintaining all of the comments from the respective users in the sequential conversation without subdividing the comments therefrom irrespective of the associated relevance scores so that the network accessible devices are enabled to apply different visual indicia to the comments in the displayed conversation to differentiate among the different relevance scores, the remote server further configured to, responsive to at least one input from a filter mechanism of the network accessible device of a selected user, selectively restrict communications from the selected user to only other users having an associated relevance score that meets or exceeds a first selected threshold and to restrict communications to the selected user only from other users having an associated relevance score that meets or exceeds a second selected threshold.

19. The system of claim 18, further comprising a non-transitory computer program in the form of an application (app) associated with the group chat session stored in a memory of and executed by a processor of each of the network accessible devices, the app configured to display each comment on a display device of the associated network accessible device in an order corresponding to a sequence in which the comments were received by the network accessible device to form a visual representation of the group chat session, the app displaying each comment using at least a selected one of a different size, style or color in relation to the associated relevance score for the user associated with the comment.

20. The system of claim 18, wherein the remote server comprises a scoring module circuit configured to store a previous relevance score for a selected user, generate a provisional updated relevance score responsive to a first parameter, generate a final updated relevance score responsive to a second parameter, and output the updated relevance score along with a new comment from the selected user during the group chat session.

21. The system of claim 18, wherein each relevance score is generated by the remote server responsive to inputs supplied from a plurality of apps from the network accessible devices.

22. The system of claim 21, wherein each relevance score is further generated responsive to at least a selected one of a volume of comments generated by each user over a selected period of time and at least one achievement of the associated user during execution of a gaming app on the associated network accessible device.

* * * * *